Dec. 3, 1963 D. R. WOERNER 3,112,917
AUTOMATIC STIRRING DEVICE
Filed July 5, 1962
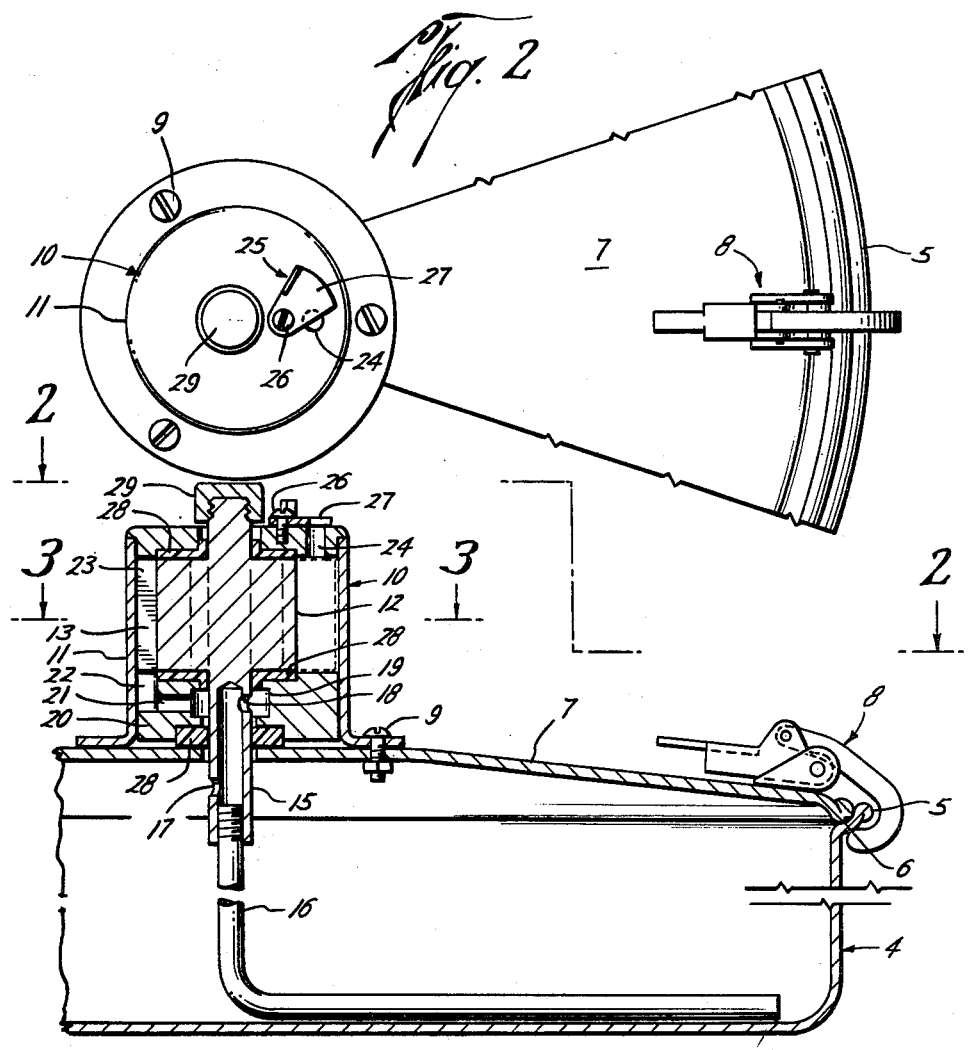
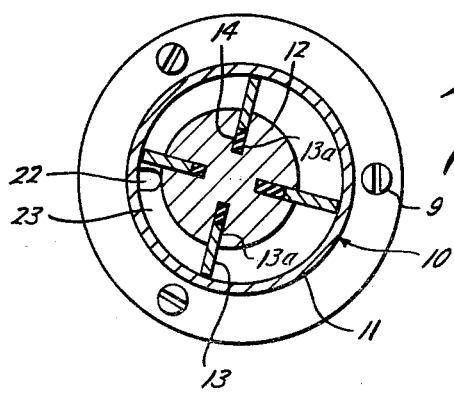
David R. Woerner
INVENTOR.

United States Patent Office 3,112,917
Patented Dec. 3, 1963

3,112,917
AUTOMATIC STIRRING DEVICE
David R. Woerner, 823 Azalea, Houston, Tex.
Filed July 5, 1962, Ser. No. 207,683
2 Claims. (Cl. 259—122)

This invention relates to an automatic stirring device for cooking vessels.

According to the invention a cooking pot or similar vessel fabricated to sustain heat on its lower surface for the purpose of transfer to a substance within its interior is provided with means of securing a lid to its open upper end, the said lid or cover having co-operating securing parts adapted to clamp such lid to the vessel. Mounted upon the lid is a motor designed to be rotated by pressure resulting from the heating of the substance within the vessel. The shaft of the said motor or rotating device is provided with a depending stem extending into the vessel. Said stem is adapted to physically stir or agitate the substance being heated.

It is therefore the chief object of this invention to provide an agitator for a cooking vessel that is activated by pressure produced in cooking.

It is another object of this invention to provide an agitator for cooking vessels that is a self-contained unit comprising a vessel and a lid with means for agitation mounted thereon.

It is a further object of this invention to provide a cooking pot adapted to securely receive a lid having means for agitation of the substance being heated.

It is also an object of this invention to provide agitating means within a pressure vessel.

For further understanding of the invention and its objects and advantages reference will be had to the following description and accompanying drawings, and to the claims in which the various novel features of the invention are more particularly set forth.

In the accompanying drawings forming a material part of this disclosure:

FIGURE 1 is a fragmentary vertical section, partly in elevation, through a cooking vessel.

FIGURE 2 is a fragmentary plan view taken along the line 2—2 of FIGURE 1.

FIGURE 3 is a horizontal section taken along the line 3—3 of FIGURE 1.

Referring now to the drawing, the numeral 4 represents a cooking pot or similar vessel having an outwardly extending lip 5, whose upper side 6 is adapted to receive the edge of lid member 7. The lid 7 is provided with suitable clamps or securing means spaced about its periphery, such as that shown at 8, so that when the lid has been clamped to the vessel the edge of said lid rests on the surface 6 of lip 5 and provides a substantially air tight seal.

Mounted in the center of the said lid 7 by screws 9 is a motor or rotating means 10. The motor comprises a housing 11 also serving as its stator and a rotor 12. The rotor 12 is mounted eccentrically within the stator 11 and is provided with the usual blades 13. The blades 13 are yieldably mounted in vertical slots 13a in the rotor 12 and are urged outwardly into contact with the inner race at the stator by resilient means 14.

At the lower end of the rotor 12 a hollow, depending shaft 15 is adapted to receive a stem or agitating means 16. The hollow portion of shaft extension 15 has a lateral port 17 communicating with the interior of vessel 4 and a lateral port 18 communicating with an annulus 19 within the base portion 20 of stator 11. A side bore 21 connects the annulus 19 with a vertical passageway 22 leading into the restricted area 23 formed by the eccentric mounting of rotor 12 within stator 11.

Pressure created within the vessel due to the heating of a substance is conducted through the ports 17, 18 into the annulus 19 and thence through ports 21 and 22 into the area 23. Thereupon the said pressure acting upon the blades 13 of the rotor 12 causes said rotor to turn in the conventional manner of pneumatic motors and finally escapes through port 24.

Port 24 is provided with a valving means 25 comprising a pivot member 26 and disc member 27 arranged to be positioned over the port 24 so as to restrict the escape of exhaust pressure. This restricting of exhaust pressure provides speed control of the rotor and its associated agitating stem 16.

The motor is provided with sealing means 28 against the escape of pressure from its allotted passage through the motor. The upper portion of the rotor is provided with a cap 29 located above the upper part of stator 11 and permits a visual reference to the speed of rotation.

While I have illustrated and described the preferred form of my invention, it is to be understood that I do not limit myself to the precise construction herein disclosed and the right is reserved to all changes and modifications coming within the scope of the invention as defined in the appended claims.

I claim:

1. A pressure cooking vessel and lid member, said lid having a pressure activated motor centrally mounted thereon, said motor having a vertically depending shaft extending into the interior of the vessel, said shaft having passageways to convey the pressure from within the vessel into the motor and the depending end of said shaft being adapted to receive a stem for stirring the contents of the vessel.

2. A pressure cooking vessel and lid member, said lid member having a variable speed pressure activated motor centrally mounted upon its upper surface, said motor comprising a stator housing secured to the lid member and a rotor member within said stator, said rotor member having a vertically depending hollow shaft extending down through said lid member and into the interior of the vessel, said shaft having a lateral port at its lower end in communication with the interior of the vessel and of said hollow shaft and a lateral port at its upper end, an annular groove in said stator, said groove being in communication with the last mentioned port in said hollow shaft to give pressure within the vessel access to the interior of the motor, and said shaft having means to receive a stem for stirring the contents of said vessel.

References Cited in the file of this patent
UNITED STATES PATENTS

| | | |
|---|---|---|
| 1,740,709 | Parket et al. | Dec. 24, 1929 |
| 2,396,924 | Monath | Mar. 19, 1946 |
| 2,557,622 | Trier | June 19, 1951 |